Figure 1:
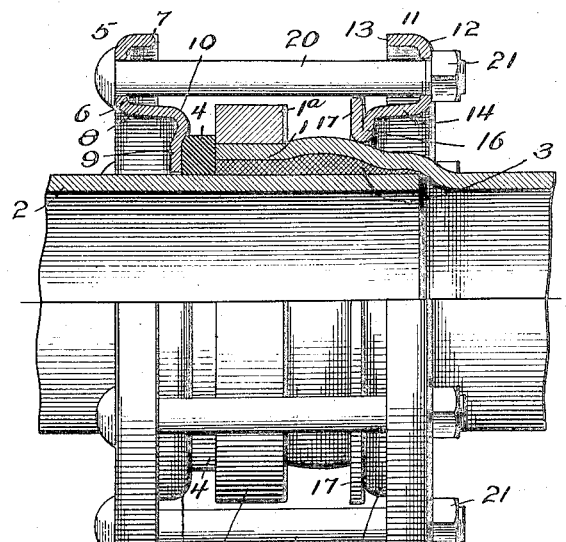

J. CLARK.
CLAMP FOR PIPE JOINTS OF THE BELL AND SPIGOT TYPE.
APPLICATION FILED OCT. 8, 1912.

1,070,667.

Patented Aug. 19, 1913.

WITNESSES

INVENTOR

Attorneys

UNITED STATES PATENT OFFICE.

JAMES CLARK, OF BRADFORD, PENNSYLVANIA, ASSIGNOR TO S. R. DRESSER MANUFACTURING COMPANY, OF BRADFORD, PENNSYLVANIA, A CORPORATION OF PENNSYLVANIA.

CLAMP FOR PIPE-JOINTS OF THE BELL-AND-SPIGOT TYPE.

1,070,667.   Specification of Letters Patent.   Patented Aug. 19, 1913.

Application filed October 8, 1912. Serial No. 724,626.

*To all whom it may concern:*

Be it known that I, JAMES CLARK, a citizen of the United States, residing at Bradford, in the county of McKean and State of Pennsylvania, have invented certain new and useful Improvements in Clamps for Pipe-Joints of the Bell-and-Spigot Type; and I do hereby declare the following to be a full, clear, and exact description of the invention, such as will enable others skilled in the art to which it appertains to make and use the same.

My invention relates to clamps for use in connection with pipe joints of the bell and spigot type, such as, for example, the Matheson joint, and others of the same general character, in which one end of each pipe section is provided with a bell to receive the spigot end or plain end of the adjacent pipe section. These joints are usually sealed with lead, or cement, or other non-elastic material which is inserted in the recess formed between the interior of the bell and the exterior of the spigot. In connection with this type of joints it is customary in many instances to employ a clamp which comprises a rubber or other elastic packing ring placed around the spigot and fitting against the end of the bell, and the non-elastic packing therein, a clamping ring for forcing the packing ring tightly against the end of the bell and the non-elastic packing, and against the exterior of the pipe, a "bull ring" or follower which surrounds the exterior of the bell, and engages one of the enlarged portions thereof to afford an abutment for the connecting bolts, and a plurality of bolts and nuts connecting the bull ring and the clamping ring for drawing the clamping ring into position to compress the elastic packing ring, thus insuring a tight joint at all times even though the non-elastic packing may become slightly loosened.

My present invention consists in a novel "bull ring" for use in this form of pipe clamp, the same being constructed entirely of wrought metal, and being specially formed to withstand the special strains to which a "bull ring" is subjected.

In the construction of a "bull ring" the greatest difficulty has been to overcome the tendency of the ring to enlarge, which is due to the fact that the portion of the bell end of the pipe which it engages is conical or tapering, and the bell end therefore acts like a taper plug, when the ring is under the tension of the bolts, thus tending to bend the metal outwardly and to enlarge the pipe aperture thereof. The friction between the bell end of the pipe and the inner portions of the ring in engagement therewith is not sufficient to prevent the ring from slipping on the pipe and thus forcing the tapered portion thereof farther and farther through the ring. Obviously the most effective disposition of metal in the ring to resist this expanding action of the pipe, is to provide a considerable portion disposed substantially perpendicular to the pipe, and I, therefore, provide the ring with an outwardly turned flange, so disposed with respect to the pipe. As, however, the expanding action of the pipe has a tendency to roll or bend this flange in a direction toward the body of the ring, I find it desirable to reinforce this flange by forming in rear of it another flange substantially parallel thereto so arranged as to not only double the amount of metal around the pipe aperture to resist outward strain, but also to back up the exterior flange and prevent it from rolling or turning in a direction toward the plate member or body of the ring.

In the accompanying drawing I have shown one embodiment of my invention selected by me for purposes of illustration, and the invention is fully disclosed in the following description and claims.

Figure 2:
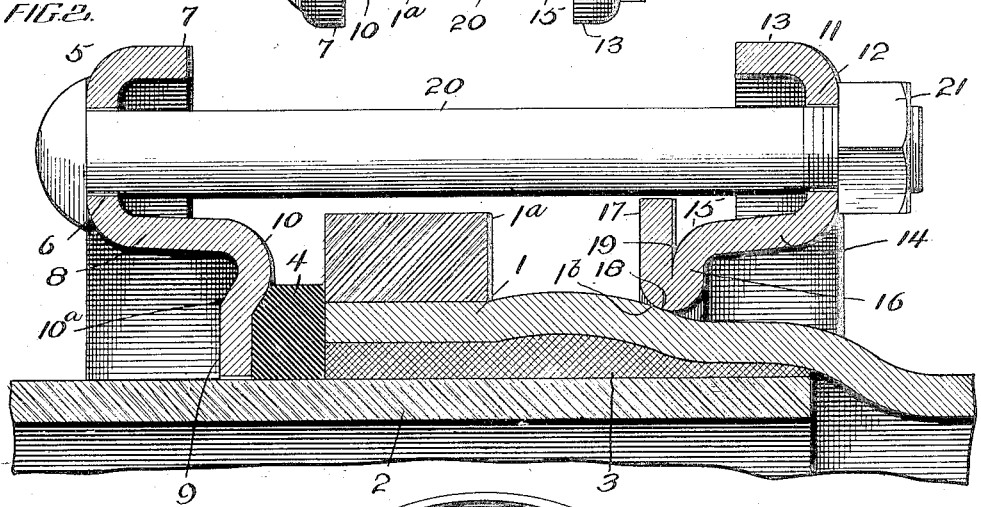
Figure 3:
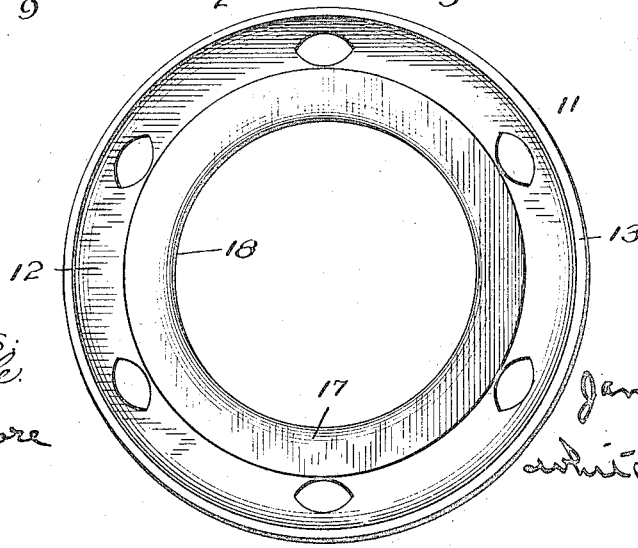

Referring to the said drawings: Figure 1 represents a sectional view of a Matheson joint, provided with a pipe clamp, the "bull ring" of which is an embodiment of my invention selected by me for purposes of illustration. Fig. 2 is an enlarged sectional view of a portion of the joint and clamp shown in Fig. 1. Fig. 3 is a plan view of the "bull ring" detached.

In the said drawings 1 represents the bell end of a pipe section, and 2 the spigot end of the adjacent pipe section fitting within the bell end and secured therein by a non-elastic packing 3, of lead, cement or other suitable material, the bell end being provided with the usual reinforcing ring 1ª, and the whole constituting the well-known Matheson joint.

4 represents the gasket or packing ring which is preferably of rubber, and 5 represents the clamping ring which may be of any known, or usual form, so far as my present invention is concerned. I have shown herein a form of clamping ring invented by me but the particular construction of the same forms no part of my present invention.

In the clamping ring herein shown, 6 represents the annular plate member thereof having bolt holes therein and provided at its outer edge with a reinforcing flange, 7, and at its inner edge with an annular wall, 8, terminating in an annular bead, 10, the metal, after being bent inwardly beyond a position perpendicular to the pipe wall to form the bead being then bent inwardly at 10ª in the reverse direction to form an annular flange, 9, disposed substantially perpendicularly to the axis and wall of the pipe. This clamping ring is formed of wrought metal and preferably from sheet steel of the desired thickness.

11 represents the bull ring which is formed of wrought metal, preferably of sheet steel, and comprises the following members.

12 is an annular plate member provided with bolt holes, and preferably having at its outer edge an annular reinforcing flange, 13, and at its inner edge a substantially cylindrical wall, 14. The metal at the outer end of the wall, 14, is bent sharply inward as at 15 and then bent backward upon itself as at 18, forming two annular portions or flanges, 16 and 17, disposed substantially perpendicularly to the axis of the ring and lying in contact with each other for a considerable distance from the bend 18, (which forms the pipe aperture of the ring) to a point indicated at 19 considerably removed from the pipe aperture.

It will be seen that the flanges, 16 and 17, which are substantially parallel, provide a very considerable amount of metal disposed perpendicularly to the axis of the pipe, and ring, and which will resist any tendency of the ring to expand and enlarge the pipe aperture. Moreover, any tendency which there might otherwise be for the flange, 17, to roll or bend toward the plate member, under the stress of the tapering portion (or shoulder) 1ᵇ of the bell (see Fig. 2) is prevented by the flange, 16, which backs up the flange, 17, and is in contact with it up to the point 19. This construction therefore provides an extremely strong "bull ring" especially adapted to resist the wedging or taper plug action of the bell end of a Matheson or other bell and spigot joint. It will also be noted that the abutting portions of the flanges, 16 and 17 are substantially in line with the wall, 14, of the ring so that the turning stress or tendency of the flange, 17, is transferred to the body or plate member of the ring in line with the wall, 14, thus positively precluding such bending or curling action from taking place.

20 represents the usual clamping bolts which are passed through the bolt holes in the "bull ring" and the clamping ring and are provided with suitable nuts, 21, for drawing the rings together.

What I claim and desire to secure by Letters Patent is:—

1. In a clamp for joints of the bell and spigot type provided with a gasket, a clamping ring and connecting bolts and nuts; a "bull ring" for engaging the bell end of said joint, formed of wrought metal, and comprising an annular plate member, an annular wall extending from the inner edge thereof substantially perpendicularly to the plate member and terminating in an inwardly bent flange, and an outwardly bent flange bent backward sharply from the inner end of the inwardly bent flange and lying in close contact therewith throughout their contiguous portions, said flanges being disposed substantially perpendicularly to the axis of the ring and pipe to resist the lateral stress exerted on the pipe aperture formed at the junction of said flanges, the inwardly extending flange reinforcing the outwardly extending flange and preventing the bending thereof in a direction to enlarge said pipe aperture.

2. In a clamp for joints of the bell and spigot type provided with a gasket, a clamping ring and connecting bolts and nuts; a "bull ring" for engaging the bell end of said joint, formed of wrought metal, and comprising an annular plate member, an annular wall extending from the inner edge thereof substantially perpendicularly to the plate member and terminating in an inwardly bent flange, and an outwardly bent flange bent backward sharply from the inner end of the inwardly bent flange and forming a rounded annular edge around the pipe aperture of the ring and lying in close contact with said inwardly bent flange throughout their contiguous portions, said flanges being disposed substantially perpendicular to the axis of the ring and pipe, and having portions in contact with each other substantially in line with the said annular wall, the said outwardly bent flange extending outwardly beyond the said annular wall, whereby said flanges will jointly resist lateral strain upon said rounded annular edge and the tendency of said outwardly bent flange to bend in a direction to enlarge the pipe aperture is resisted by the inwardly bent flange and by said annular wall.

In testimony whereof I affix my signature, in the presence of two witnesses.

JAMES CLARK.

Witnesses:
H. M. WICK,
M. CLARK.